(12) United States Patent
Kwon et al.

(10) Patent No.: US 12,148,349 B2
(45) Date of Patent: Nov. 19, 2024

(54) DISPLAY DEVICE AND OPERATING METHOD THEREOF

(71) Applicant: LG ELECTRONICS INC., Seoul (KR)

(72) Inventors: Jeonghwan Kwon, Seoul (KR); Eunjung Lee, Seoul (KR); Hyojeong Jeong, Seoul (KR); Kyungnam Bae, Seoul (KR); Byounghyun Shin, Seoul (KR); Taejin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 17/714,784

(22) Filed: Apr. 6, 2022

(65) Prior Publication Data

US 2023/0274684 A1    Aug. 31, 2023

(30) Foreign Application Priority Data

Feb. 28, 2022  (KR) .................. 10-2022-0025741

(51) Int. Cl.
*G09G 3/20* (2006.01)

(52) U.S. Cl.
CPC ....... *G09G 3/2092* (2013.01); *G09G 2340/04* (2013.01); *G09G 2354/00* (2013.01); *G09G 2370/16* (2013.01)

(58) Field of Classification Search
CPC ............. G09G 3/2092; G09G 2340/04; G09G 2354/00; G09G 2370/16; G09G 2340/0492; G06F 3/1454; G06T 7/70; G06V 20/63; H04L 67/1095; H04N 21/44008; H04N 21/440263; H04N 21/43637;
(Continued)

(56) References Cited

U.S. PATENT DOCUMENTS

| 10,574,896 B2 * | 2/2020 | Kondo ................... H04N 23/62 |
| 2007/0171240 A1 * | 7/2007 | Koh ........................ G09G 5/363 |
| | | 345/649 |

(Continued)

FOREIGN PATENT DOCUMENTS

| EP | 3709155 | 9/2020 |
| KR | 20180025763 | 3/2018 |

(Continued)

OTHER PUBLICATIONS

KR 2018 0025763A (Machine Translation on Sep. 19, 2023) (Year: 2018).*

(Continued)

*Primary Examiner* — Michael Le
(74) *Attorney, Agent, or Firm* — LEE, HONG, DEGERMAN, KANG & WAIMEY

(57) ABSTRACT

A display device comprises a wireless communication interface configured to receive, from a terminal, an image signal corresponding to a source image which is being displayed by the terminal, a display configured to operate in a landscape posture mode or a portrait posture mode, and a controller configured to determine a display direction of the received image signal when the display operates in the portrait posture mode and to display a mirrored image in a portrait direction on the display based on the image signal when the display direction of the image signal is a portrait direction.

13 Claims, 15 Drawing Sheets

(58) Field of Classification Search
CPC ............ H04N 21/4621; H04N 7/0122; H04N 21/43076; H04N 21/4888
See application file for complete search history.

(56) References Cited

U.S. PATENT DOCUMENTS

| | | | |
|---|---|---|---|
| 2013/0215109 A1* | 8/2013 | Miesnieks | G06T 13/20 |
| | | | 345/419 |
| 2017/0213389 A1* | 7/2017 | Han | G09G 5/377 |
| 2018/0183996 A1* | 6/2018 | Takahashi | H04N 23/667 |
| 2020/0371734 A1* | 11/2020 | Kawano | G06F 3/0416 |
| 2020/0380901 A1* | 12/2020 | Ryu | G06F 3/1423 |
| 2021/0314520 A1* | 10/2021 | Yu | H04N 21/4438 |
| 2022/0011996 A1* | 1/2022 | Ota | H04N 1/3877 |
| 2022/0300241 A1* | 9/2022 | Song | H04N 5/655 |

FOREIGN PATENT DOCUMENTS

| | | | |
|---|---|---|---|
| KR | 20180025763 A * | 3/2018 | |
| KR | 1020200108760 | 9/2020 | |
| KR | 1020220003378 | 1/2022 | |

OTHER PUBLICATIONS

European Patent Office Application Serial No. 22165552.5, Extended European Search Report dated Sep. 8, 2022, 8 pages.
LG Electronics Inc., "2021 Lifestyle TC (Stanbyme) Latest Software_27ART10_LM21UT)_Ver.03.10.03," LG Electronics, Product User Manuals, Dec. 2021, 7 pages.
Korean Intellectual Property Office Application No. 10-2022-0025741, Notice of Allowance dated Mar. 27, 2024, 2 pages.

\* cited by examiner

FIG. 11

| | DISPLAY ROTATION ANGLE | DISPLAY SCREEN |
|---|---|---|
| PC TRANSMISSION IMAGE (LANDSCAPE IMAGE) 1110 (x, y) | 0 | (a, b) — 1111 |
| | 90 | (a, b) — 1113 |
| PC TRANSMISSION IMAGE (PORTRAIT IMAGE) 1130 (x, y) 1130a | 0 | (a, b) — 1131 |
| | 90 | 1133a (a, b) — 1133 |

DISPLAY DEVICE AND OPERATING METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2022-0025741, filed on Feb. 28, 2022, the contents of which are all hereby incorporated by reference herein in its entirety.

BACKGROUND OF THE INVENTION

The present disclosure relates to a display device.

Discussion of the Related Art

Digital TV services using wired or wireless communication networks are becoming common. Digital TV services may provide various services which cannot be provided by the existing analog broadcast service.

For example, Internet protocol television (IPTV) and smart TV services which are types of digital TV services provide interactivity to allow user to actively select a type of a program to be watched, a viewing time, etc. The IPTV and smart TV services may provide various additional services, such as Internet search, home shopping and online games, based on such interactivity.

In addition, recent TVs provide a screen mirroring function such as screen sharing with a terminal.

In particular, TV may provide a screen sharing service with a terminal such as a PC.

However, when a conventional PC provides a screen sharing service with a TV, such as Miracast, if the display of the TV is in a portrait posture mode and the transmitted image of the PC is in a portrait display direction, the TV may not recognize a display direction of the transmitted image of the PC.

Therefore, the display in the TV in the portrait mode recognizes the transmitted image of the PC in the landscape direction, and thus the display direction of a mirrored image is misaligned.

This leads to user convenience when watching the mirrored image.

SUMMARY OF THE INVENTION

An object of the present disclosure is to enable a display device to display a mirrored image in a correct viewing direction during a screen sharing service between a personal computer (PC) and a rotatable display device.

Another object of the present disclosure is to recognize an image display direction of a PC during a screen sharing service between a personal computer (PC) and a rotatable display device.

A display device according to an embodiment of the present disclosure comprises a wireless communication interface configured to receive, from a terminal, an image signal corresponding to a source image which is being displayed by the terminal, a display configured to operate in a landscape posture mode or a portrait posture mode, and a controller configured to determine a display direction of the received image signal when the display operates in the portrait posture mode and to display a mirrored image in a portrait direction on the display based on the image signal when the display direction of the image signal is a portrait direction.

The controller may be configured to determine the display direction of the image signal using an arrangement direction of a character string of text included in the image signal.

According to various embodiments of the present disclosure, even when the image display direction of a PC is in a portrait direction and the posture of a display device is a portrait posture while a screen sharing service is provided, a mirrored image may be output in a correct direction.

Therefore, a user may watch the mirrored image without inconvenience without separate operation and thus an improved user experience may be provided.

BRIEF DESCRIPTION OF THE DRAWINGS

FIG. 11 is a view illustrating a logic for transforming UIBC coordinates according to a display direction mode of a PC and a posture mode of a display device.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
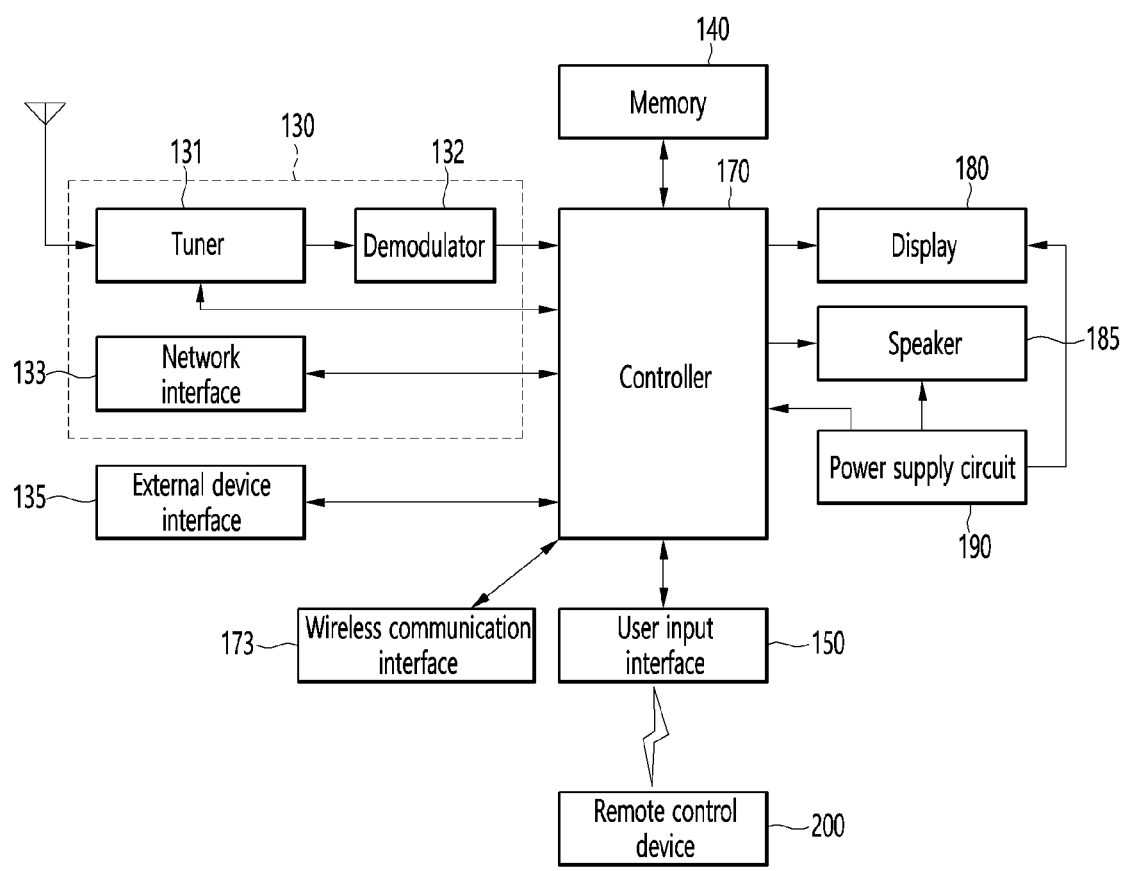
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may receive one or more of images and audio output from an external device connected to the display device 100 in a wired or wireless manner, and transmit the same to the controller 170. The external device interface 135 may include a plurality of external input terminals.

The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi(Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 to 3.

Figure 2:
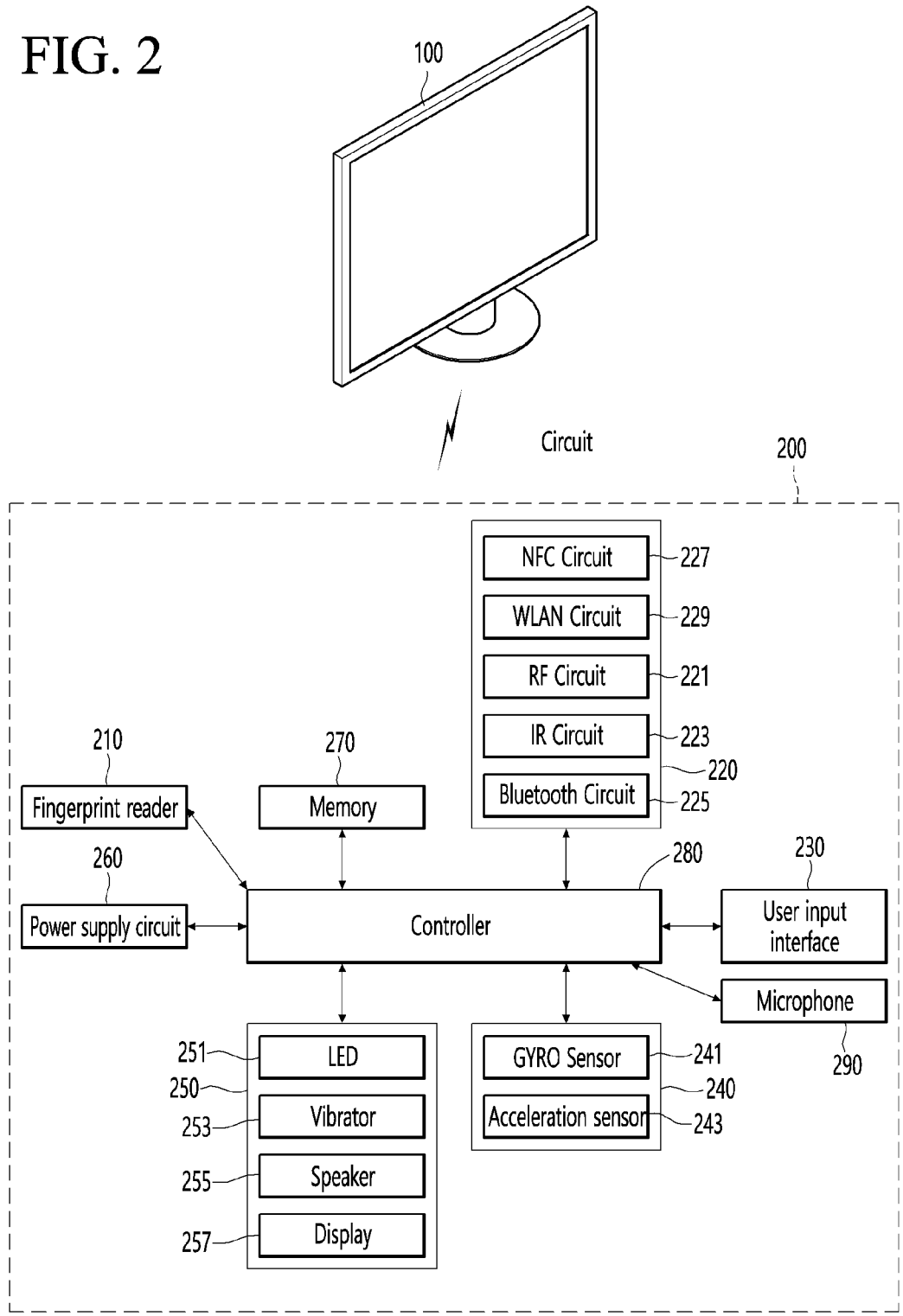
FIG. 2 is a block diagram of a remote control device according to an embodiment of the present disclosure.
Figure 3:
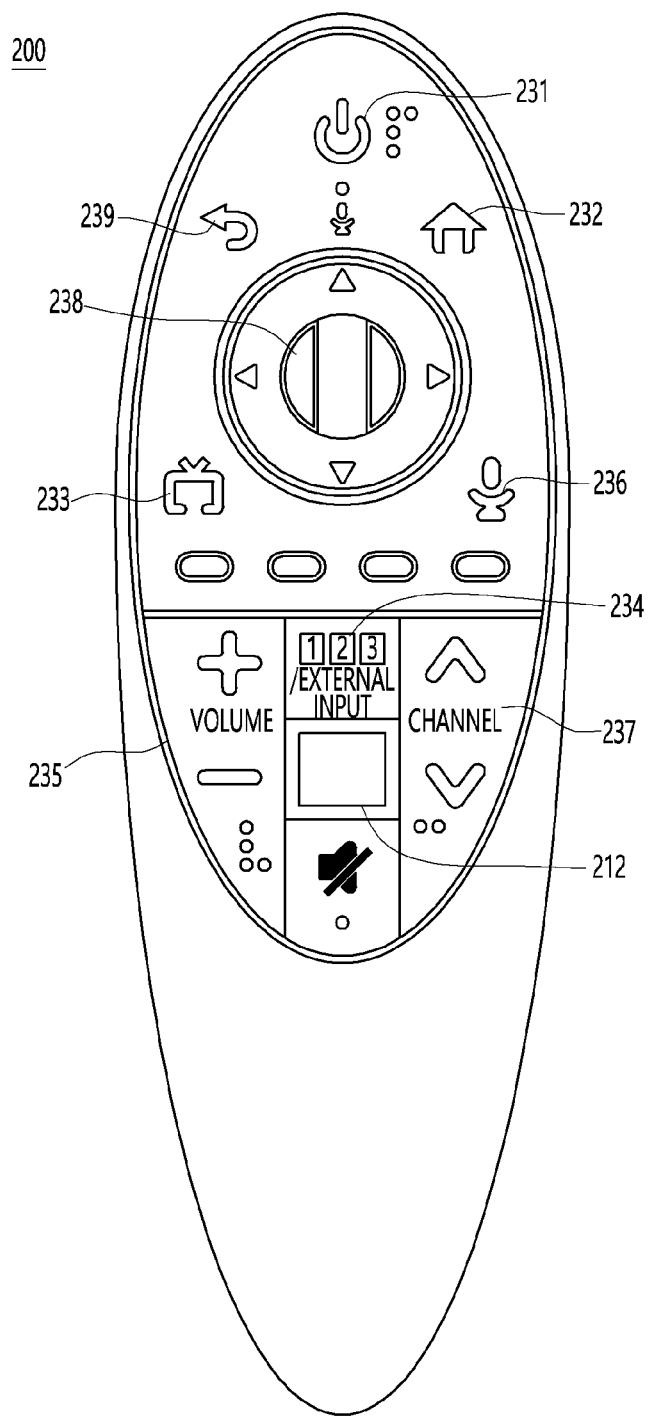
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
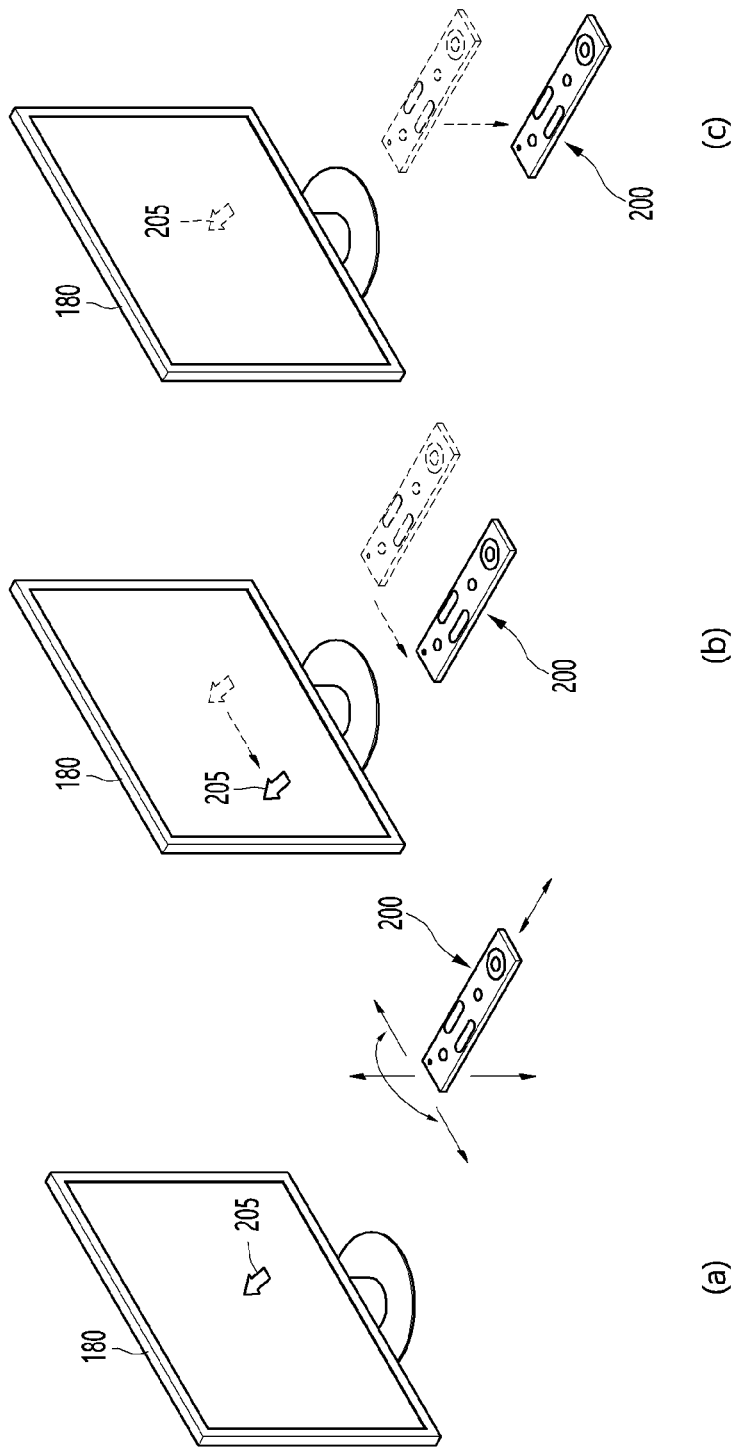
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
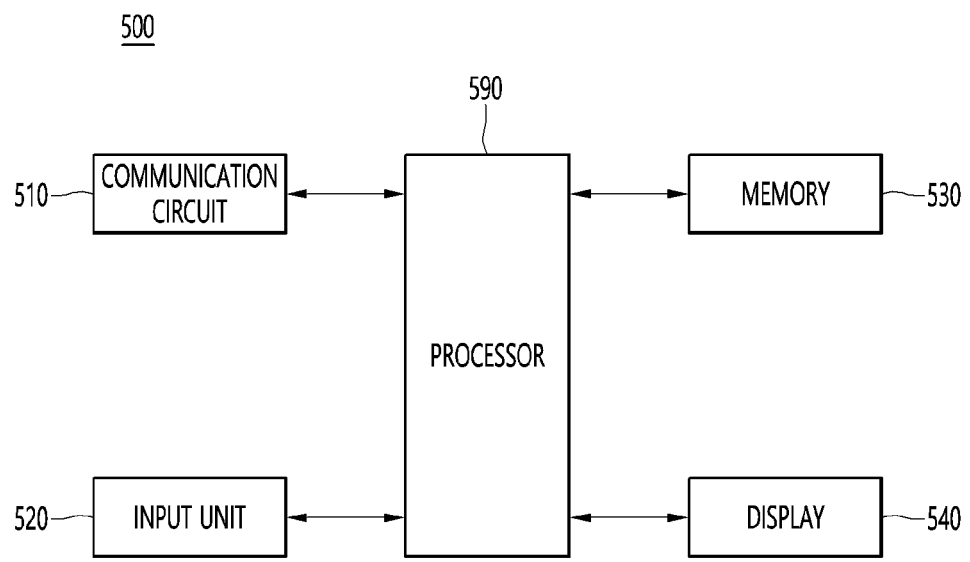
FIG. 5 is a block diagram illustrating a configuration of a terminal according to an embodiment of the present disclosure.

FIG. 5 is a block diagram illustrating a configuration of a terminal according to an embodiment of the present disclosure.

The terminal 500 may be implemented by a desktop computer, a laptop, a fixed device or a movable device.

Referring to FIG. 5, the terminal 500 may include a communication circuit 510, an input unit 520, a memory 530, a display 540 and a processor 590.

The communication circuit 510 may transmit and receive data to and from external devices such as another terminal or a server using wired/wireless communication technology.

The communication circuit 510 may perform communication using any one of GSM (Global System for Mobile communication), CDMA (Code Division Multi Access), LTE (Long Term Evolution), 5G, WLAN (Wireless LAN), Wi-Fi (Wireless-Fidelity), Bluetooth, RFID (Radio Frequency Identification), Infrared Data Association (IrDA), ZigBee and NFC (Near Field Communication) communication standards.

The input unit 520 may include a camera for inputting an image signal, a microphone for receiving an audio signal, and a user input unit for receiving information from a user.

Here, the camera or the microphone may be treated as a sensor and a signal obtained from the camera or the microphone may be referred to as sensing data or sensor information.

The memory 530 may store a variety of software and data related to operation of the terminal 500.

The display 540 may display an image signal received from the outside.

The processor 590 may control overall operation of the terminal 500.

When connection with an external device is necessary to perform operation of the terminal 500, the processor 590 may generate a control signal for controlling the external device and transmit the generated control signal to the external device.

The processor 590 may obtain intention information with respect to user input and determine user requirements based on the obtained intention information.

The processor 590 may control at least some of the components of the terminal 500, in order to execute an application program stored in the memory 530.

The processor 590 may operate by combining two or more of the components of the terminal 500, in order to execute the application program.

Figure 6A:
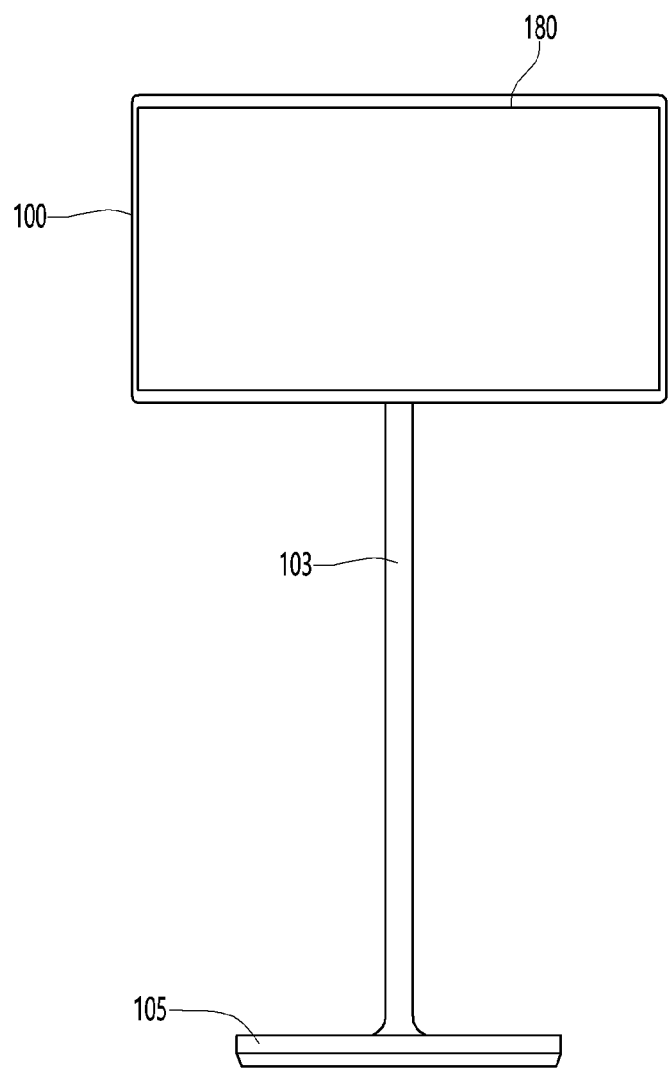
FIGS. 6a and 6b are views illustrating a landscape mode and portrait mode of a stand-type display device according to an embodiment of the present disclosure.
Figure 6B:
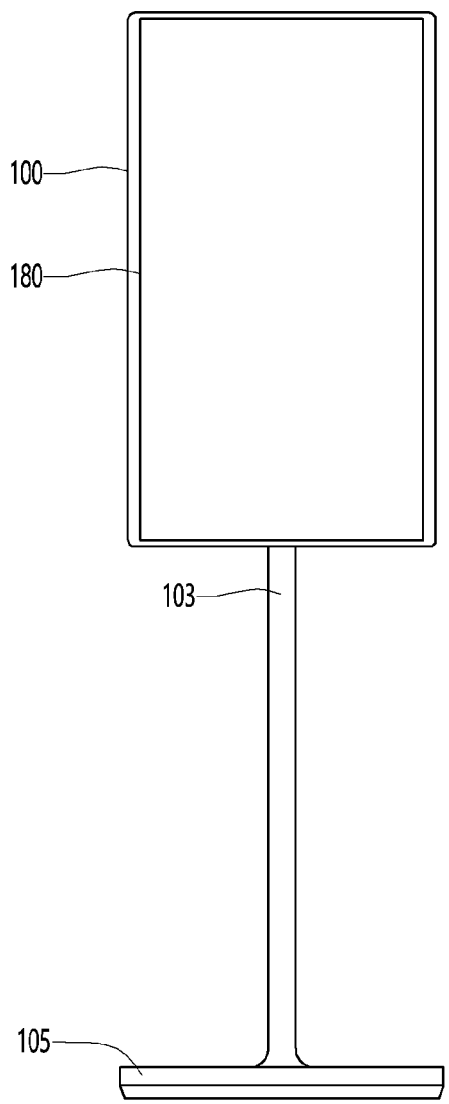

FIGS. 6a and 6b are views illustrating a landscape mode and portrait mode of a stand-type display device according to an embodiment of the present disclosure.

Referring to FIGS. 6a and 6b, the stand-type display device 100 is shown.

The display device 100 may be connected with a shaft 103 and a stand base 105.

The shaft 103 may connect the display device 100 and the stand base 105. The shaft 103 may vertically extend.

A lower end of the shaft 103 may be connected to an edge of the stand base 105.

The lower end of the shaft 103 may be rotatably connected to the circumference of the stand base 105.

The display device 100 and the shaft 103 may rotate about a vertical axis with respect to the stand base 105.

An upper portion of the shaft 103 may be connected to a rear surface of the display device 100.

The stand base 105 may serve to support the display device 100.

The display device 100 may be configured to include the shaft 103 and the stand base 105.

The display device 100 may rotate around a point where the upper portion of the shaft 103 and the rear surface of the display 180 contact each other.

FIG. 6a shows operation in a landscape mode having a posture in which the width of the display 180 is greater than the height of the display, and FIG. 6b shows operation in a portrait mode having a posture in which the height of the display 180 is greater than the width of the display.

A user may move while holding the stand-type display device. That is, the stand-type display device has improved mobility unlike a fixed device and thus the user does not feel inhibited by the arrangement position thereof Hereinafter, the vertical may be called a portrait and the horizontal may be called a landscape.

In addition, the display direction mode of the terminal 500 may include a portrait display mode and a landscape display mode.

The portrait display mode of the terminal 500 may be a mode in which an image display direction is vertical and the landscape display mode may be a mode in which an image display direction is horizontal.

The posture mode of the display device 100 may be a mode representing the posture of the display 180.

The posture mode of the display device 100 may include a portrait posture mode in which the display 180 is arranged in a vertical form and a landscape posture mode in which the display 180 is arranged in a horizontal form.

That is, the landscape posture mode of the display 180 may be a mode in which the width is greater than the height, as shown in FIG. 6a.

The portrait posture mode of the display 180 may be a mode in which the height of the display 180 is greater than the width of the display, as shown in FIG. 6b.

Figure 7A:
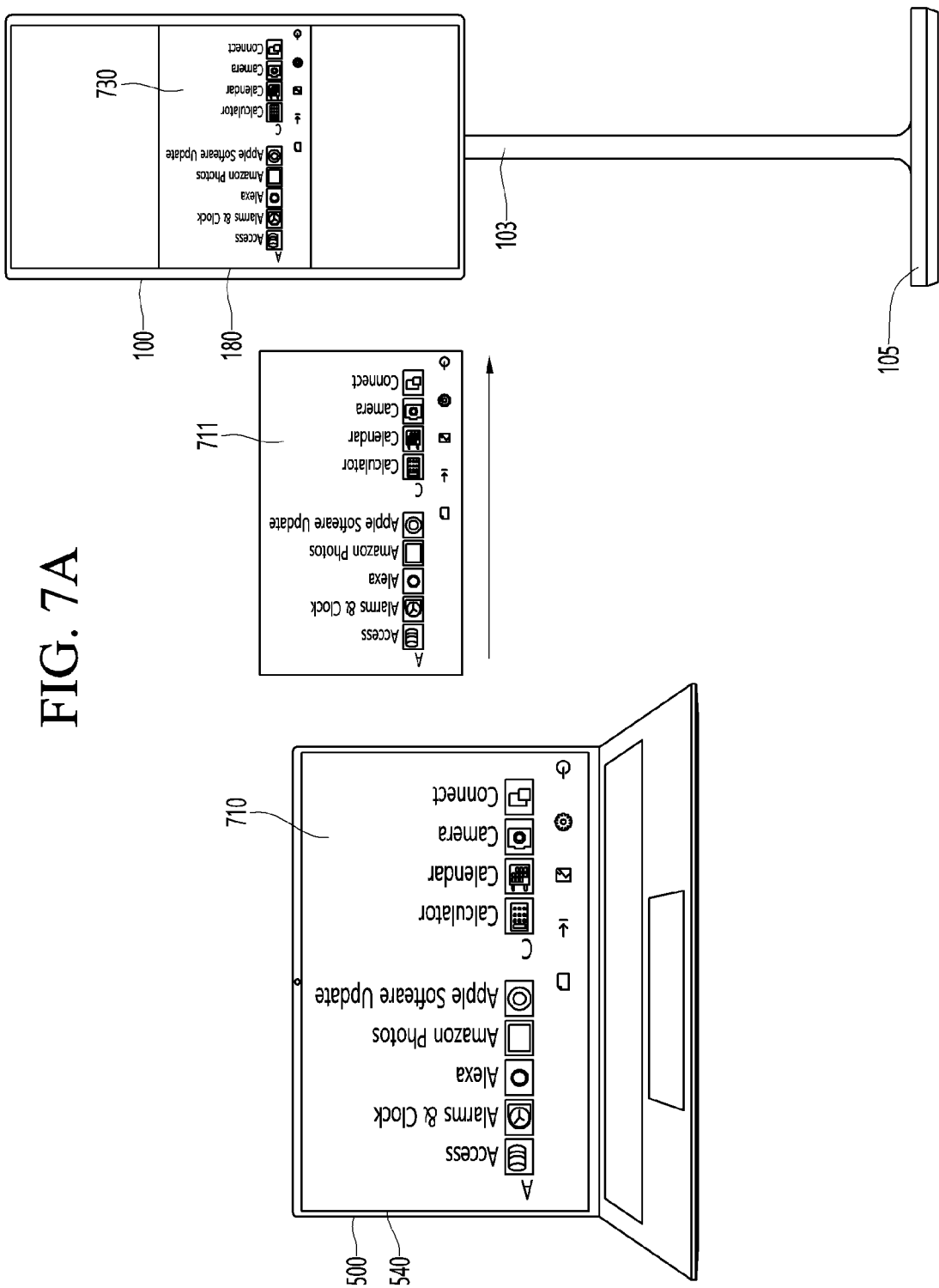
FIGS. 7a and 7b are views illustrating a problem of a screen sharing system according to the related art.
Figure 7B:
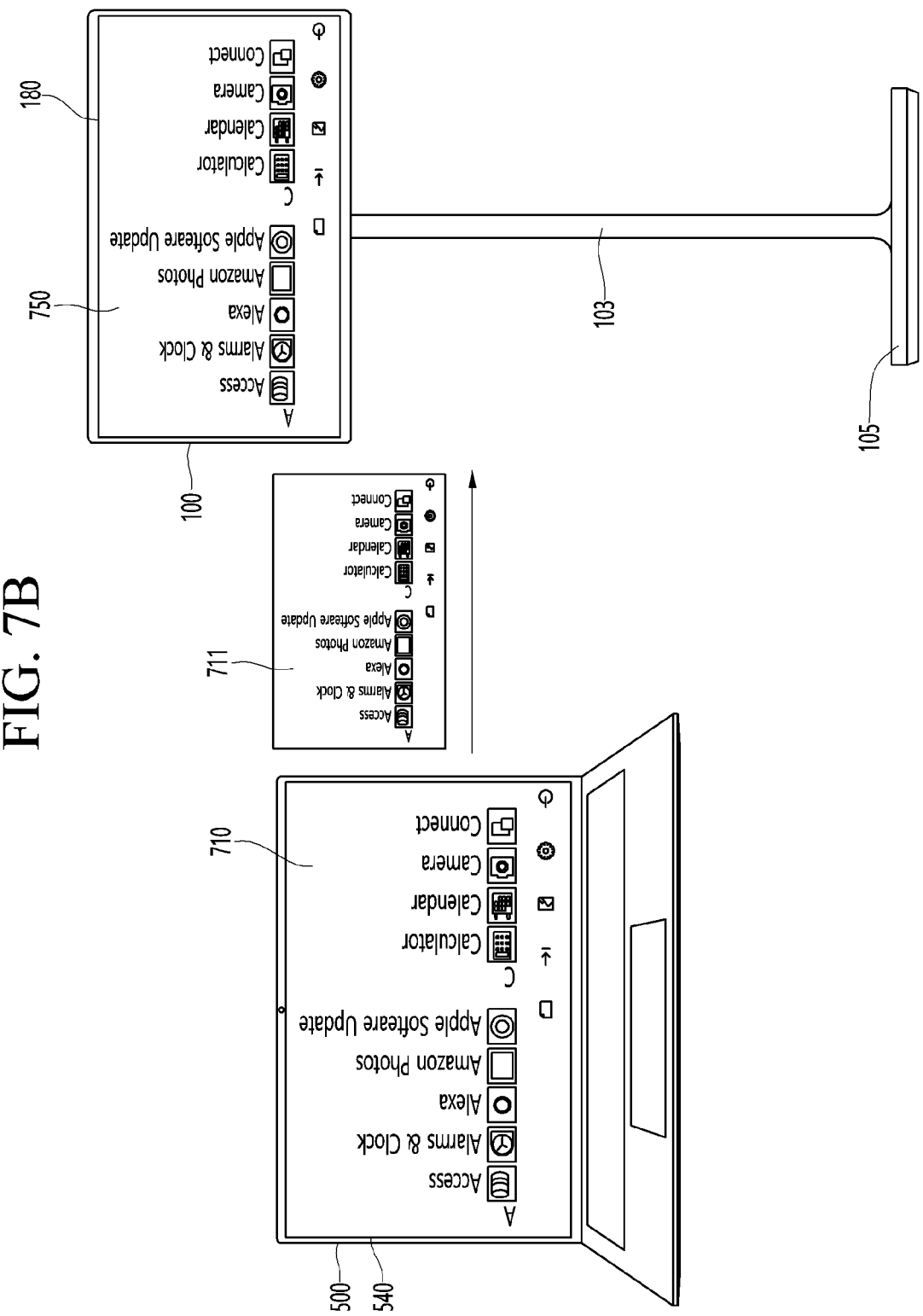

FIGS. 7a and 7b are views illustrating a problem of a screen sharing system according to the related art.

In FIGS. 7a and 7b, it is assumed that the terminal 500 is a PC and the image display mode of the terminal 500 is a portrait display mode.

In FIG. 7a, the display device 100 is in the portrait posture mode, and, in FIG. 7b, the display device 100 is in the landscape posture mode.

The terminal 500 transmits, to the display device 100, an image signal 711 corresponding to a portrait image 710 (source image) which is being displayed on the display 540 by the terminal 500 in the portrait display mode, for a screen sharing service.

Since the display direction mode of the terminal 500 is in the portrait display mode, the transmitted image signal 711 may also be transmitted to have a portrait direction.

Since there is no method of determining whether the display direction mode of the terminal 500 is a portrait display mode or a landscape display mode, the display device 100 may display a mirrored image 730 based on the portrait image signal 711 on the display 180 without rotation.

After all, from the user's point of view, when the display direction mode of the PC is a portrait display mode and the display device 100 is a portrait posture mode, the full image cannot be viewed and the screen orientation is not correct and thus discomfort may occur in viewing.

That is, since the display device 100 cannot recognize the display direction mode of the PC, the above-described problems occurs.

Referring to FIG. 7b, the terminal 500 transmits, to the display device 100, the image signal 711 corresponding to an image 540 which is being displayed on the display 540 by the terminal 500 in the portrait display mode for the screen sharing service.

Since the display direction mode of the terminal 500 is a portrait display mode, the transmitted image signal 711 may also be transmitted to the portrait direction.

Since there is no method of determining whether the display direction mode of the terminal 500 is a portrait display mode or a landscape display mode, the display device 100 may display a mirrored image 750 based on the portrait image signal 711 on the display 180 without rotation.

Similarly to the example of FIG. 7a, from the user's point of view, when the display direction mode of the PC is a portrait display mode and the display device 100 is a landscape posture mode, the display direction of the mirrored image 750 is not correct and thus discomfort may occur in viewing.

In addition, since the display device 100 cannot recognize the display direction mode of the PC, the above-described problem occurs.

In an embodiment of the present disclosure, a method of displaying a mirrored image by the display device 100 according to the display direction of the image signal received from the PC will be described.

Figure 8:
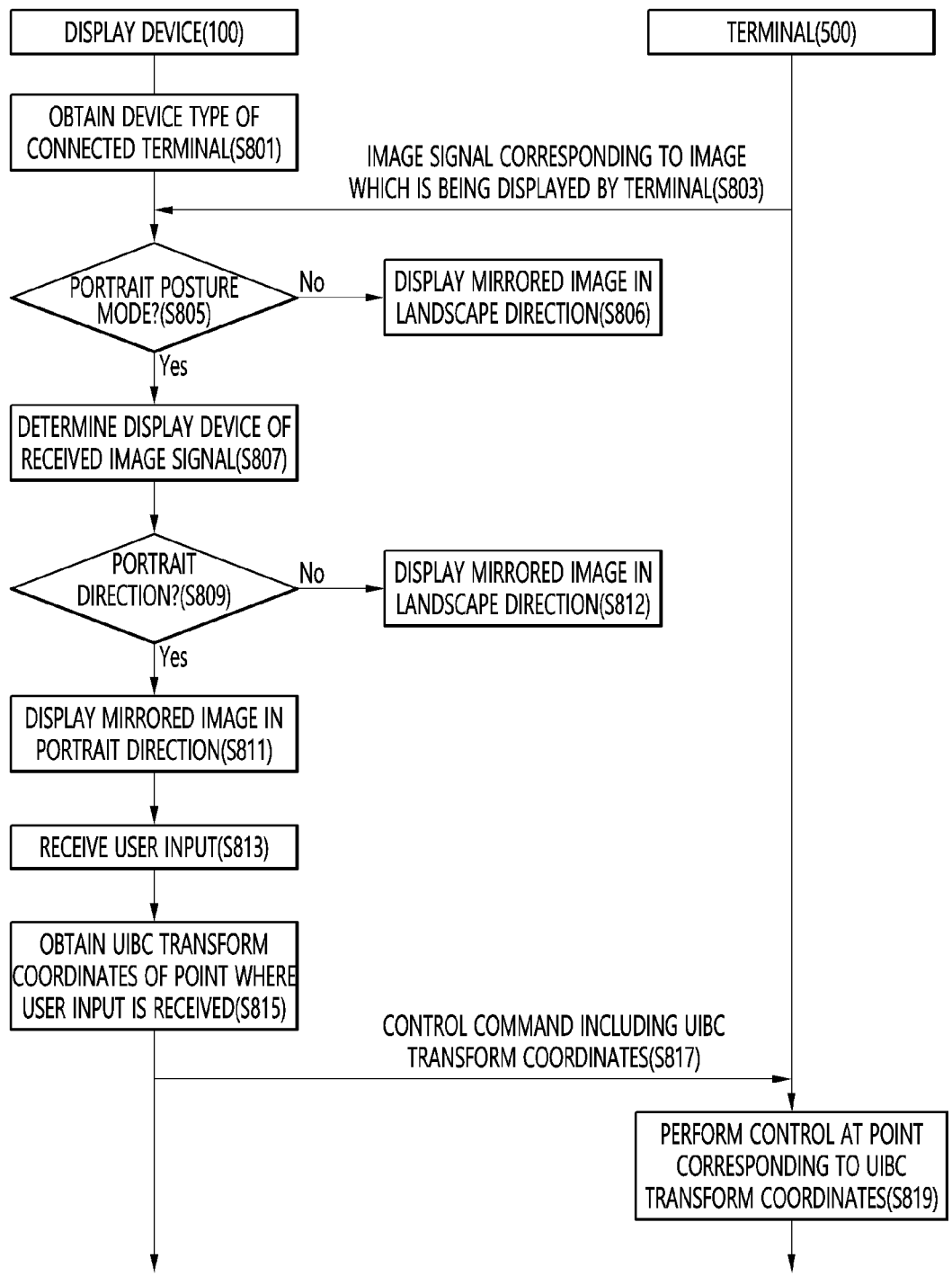
FIG. 8 is a ladder diagram illustrating a method of operating a screen sharing system according to an embodiment of the present disclosure.

FIG. 8 is a ladder diagram illustrating a method of operating a screen sharing system according to an embodiment of the present disclosure.

In the following embodiment, the terminal 500 may be referred to as a source device for transmitting an image for the screen sharing service, and the display device 100 may be referred to as a sink device for receiving an image.

The controller 170 of the display device 100 may obtain a device type of the terminal 500 connected through the wireless communication interface 173 (S801).

In an embodiment, the device type may be any one of a personal computer (PC) type, a cellular phone type and an external device type excluding the PC and the cellular phone.

The display device 100 and the terminal 500 may be connected to each other through the Wi-Fi Direct standard.

The controller 170 may receive information on the device type from the terminal 500 in a Wi-Fi protected setup (WPS) process with the terminal 500.

The display device 100 and the terminal 500 may share information with each other through a capability negotiation process.

The display device 100 and the terminal 500 may exchange a request message necessary for the capability negotiation process using a Real Time Streaming Protocol.

In an embodiment, an RTSP request message may include manufacturer information of the terminal 500. When the manufacturer is identified as a company for manufacturing a specific PC, the controller 170 may determine the device type of the terminal 500 to be a PC type.

The controller 170 of the display device 100 receives an image signal corresponding to an image which is being displayed by the terminal 500 through the wireless communication interface 172 (S803).

The controller 170 may receive a screen sharing service request from the terminal 500 through the wireless communication interface 173, and receive an image signal corresponding to the image which is being displayed by the terminal 500 according to the screen sharing service request.

The controller 170 of the display device 100 determines whether the posture mode of the display 180 is a portrait posture mode (S805).

In an embodiment, when the image signal received from the terminal 500 is received, the controller 170 may determine whether the posture mode of the display 180 is a portrait posture mode or a landscape posture mode.

In another embodiment, in step S805, the posture mode of the display 180 may be checked in advance before receiving the image signal from the terminal 500.

The controller 170 may measure the rotation angle of the display 180 using a gyro sensor.

When the rotation angle of the display 180 is 0 degrees, the controller 170 may determine that the posture mode of the display 180 is the landscape posture mode.

When the rotation angle of the display 180 is +90 degrees or −90 degrees, the controller 170 may determine that the posture mode of the display 180 is a portrait posture mode.

Upon determining that the posture mode of the display 180 is the landscape posture mode, the controller 170 of the display device 100 displays a mirrored image in a landscape direction (S806).

Upon determining that the posture mode of the display 180 is the portrait posture mode, the controller 170 of the display device 100 determines the display direction of the received image signal (S807).

The controller 170 may determine whether the display direction is a portrait direction or a landscape direction based on the received image signal.

The controller 170 may determine that the display direction mode of the terminal 500 is a portrait display mode when the display direction of the image signal is a portrait direction and determine that the display direction mode of the terminal 500 is a landscape display mode when the display direction of the image signal is a landscape direction.

In an embodiment, the controller 170 may determine the display direction of the image by recognizing a display direction of an icon and a character string included in the image received from the terminal 500.

Hereinafter, only the character string direction will be described as an example, but the present disclosure is not limited thereto and graphic user interface (GUI) elements such as an icon display direction and a screen arrangement direction may be used to determine the display direction of the image.

This will be described with reference to FIGS. 9a and 9b.

Figure 9A:
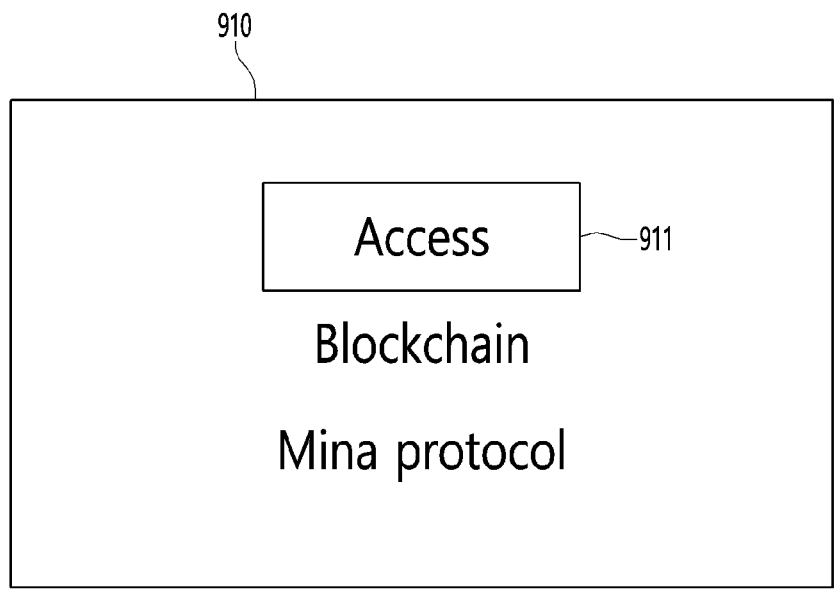
FIGS. 9a and 9b are views illustrating examples of determining a display direction of an image by recognizing a character string direction according to an embodiment of the present disclosure.
Figure 9B:
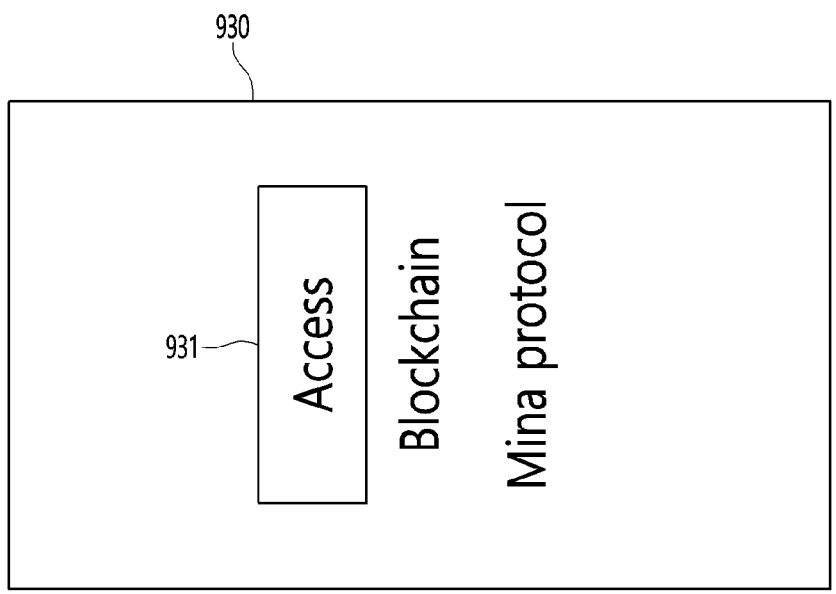

FIGS. 9a and 9b are views illustrating examples of determining a display direction of an image by recognizing a character string direction according to an embodiment of the present disclosure.

FIG. 9a shows a landscape image 910 in a landscape direction transmitted from the terminal 500 to the display device 100, and FIG. 9b shows a portrait image 930 in a portrait direction transmitted from the terminal 500 to the display device 100.

As shown in FIG. 9a, the controller 170 may recognize first text 911 included in the portrait image 910 received from the terminal 500.

The controller 170 may recognize the first text 911 included in the landscape image 910 through an optical character recognition (OCR) method.

The controller 170 may recognize the display direction of the recognized first text 911. When the character string configuring the first text 911 is arranged from left to right, the controller 170 may recognize the display direction of the first text 911 as the landscape direction.

That is, in <Access> of the first text 911, since the characters are arranged from left to right, the display direction of the first text 911 may be a landscape direction.

When the display direction of the first text 911 is a landscape direction, the controller 170 may determine the image display mode of the terminal 500 to be a landscape display mode.

Next, FIG. 9b will be described.

The controller 170 may recognize second text 931 included in the portrait image 930 through an optical character recognition (OCR) method.

The controller 170 may recognize the display direction of the recognized second text 931. When the character string configuring the second text 931 is arranged from bottom to top, the controller 170 may recognize the display direction of the second text 931 as the portrait direction.

When the display direction of the second text 931 is a portrait direction, the controller 170 may determine the image display mode of the terminal 500 to be a portrait display mode.

According to an embodiment of the present disclosure, the display device 100 may determine the image display mode of the terminal 500 using the display direction of text included in the image received from the terminal 500.

FIG. 8 will be described again.

When the display direction of the received image signal is determined to be the portrait direction (S809), the controller 170 of the display device 100 displays a mirrored image in a portrait direction on the display 180 in the portrait posture mode based on the image signal (S811).

When the display direction of the received image is a portrait direction, the controller 170 may determine that the image display mode of the terminal 500 is a portrait display mode.

When the posture mode is a portrait posture mode and the display direction of the image signal received from the terminal 500 is a portrait mode, the controller 170 may rotate the mirrored image based on the received image signal clockwise by 90 degrees and display it on the display 180.

This will be described with reference to the following drawing.

Figure 10:
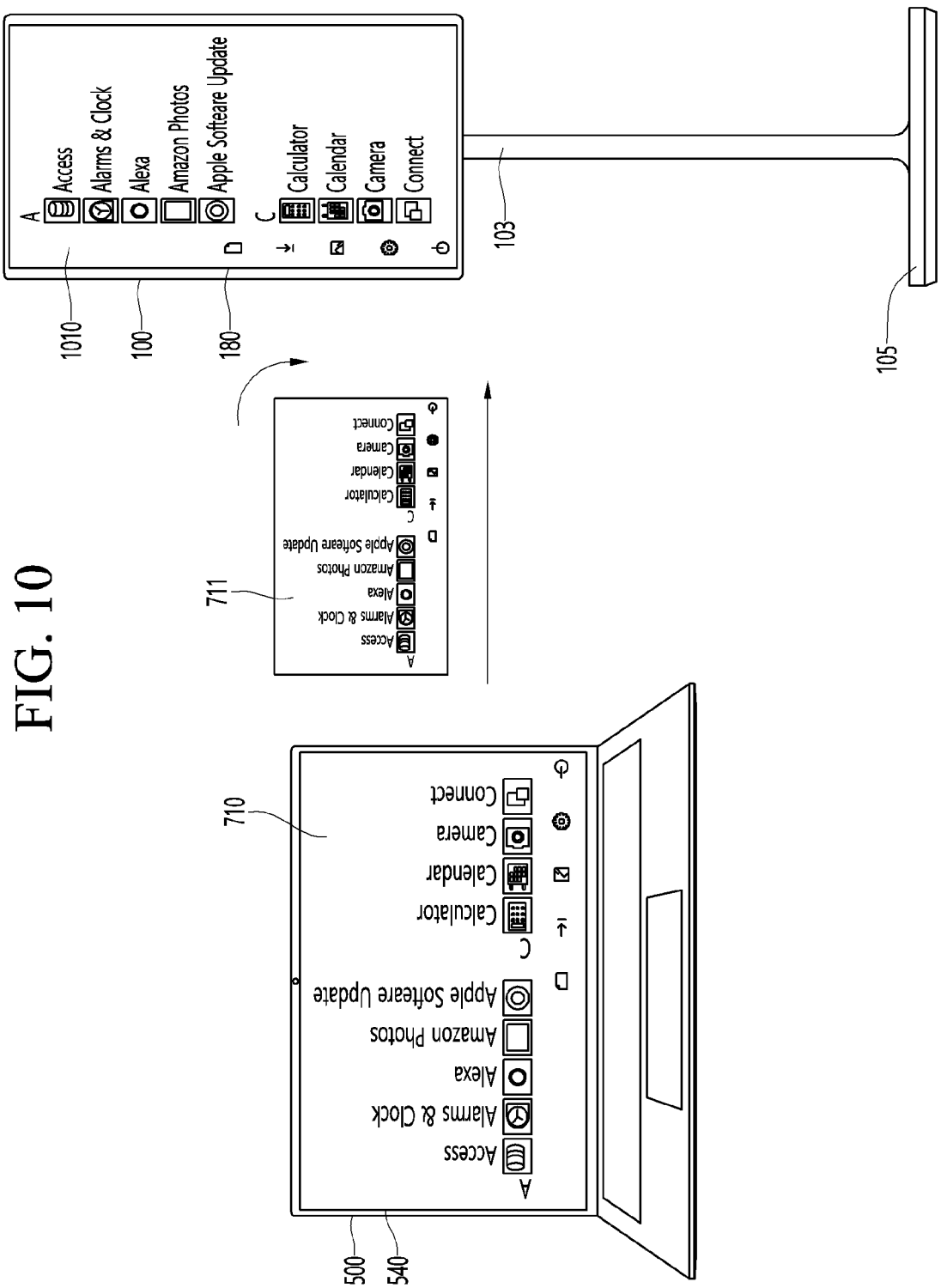
FIG. 10 is a view illustrating handling of a mirrored image when the posture mode of a display device according to an embodiment of the present disclosure is a portrait posture mode and an image display mode of a terminal is a portrait display mode.

FIG. 10 is a view illustrating handling of a mirrored image when the posture mode of a display device according to an embodiment of the present disclosure is a portrait posture mode and an image display mode of a terminal is a portrait display mode.

Referring to FIG. 10, the terminal 500 is a PC, the image display mode of the PC is a portrait display mode, and a portrait image 710 (source image) is displayed through the display 540.

The posture mode of the display device 100 is a portrait posture mode.

The terminal 500 may transmit, to the display device 100, an image signal 711 corresponding to a portrait image 710 according to a mirroring request (or Miracast request).

The display device 100 in the portrait posture mode may recognize text from the image signal 711 and determine the display direction of the image signal 711 through the arrangement direction of a character string configuring the text.

When the display direction of the image signal 711 is a portrait direction, the display device 100 may rotate the image signal 711 clockwise by 90 degrees and display a mirrored image 1010 in a portrait direction on the display 180.

Compared to FIG. 7a, according to the embodiment of FIG. 10, the user may watch the mirrored image 1010 in a state in which the screen of the display 180 is full, even when the display device 100 is a portrait posture mode.

Therefore, the user may not feel discomfort while watching the mirrored image 1010 and thus feel improved user experience.

FIG. 8 will be described again.

When the display direction of the image signal is a landscape direction, the controller 170 of the display device 100 displays a mirrored image in the landscape mode on the display 180 in the portrait posture mode (S813).

This will be described with reference to the following drawings.

After step S811, the controller 170 of the display device 100 receives user input (S813), and obtain user input back channel (UIBC) coordinates corresponding to a point where user input is received (S815).

The controller 170 may transform the coordinates of a point where user input is received according to the display direction mode of the terminal 500 and obtain UIBC transform coordinates.

The controller 170 may obtain rotation coordinates obtained by rotating the coordinates of the point where user input is received counterclockwise by 90 degrees on the display 180.

The controller 170 may obtain UIBC transform coordinates by transforming the obtained rotation coordinates according to resolution (or aspect ratio) of the terminal 500.

The controller 170 may receive the resolution (or aspect ratio) of the terminal 500 from the terminal 500 and store it in advance in the capability negotiation process with the terminal 500.

FIG. 11 is a view illustrating a logic for transforming UIBC coordinates according to a display direction mode of a PC and a posture mode of a display device.

Referring to FIG. 11, a landscape image 1110 and a portrait image 1130 transmitted from the PC to the display device 100 are shown.

When the rotation angle of the display 180 is 0 degrees, the posture mode of the display 180 is a landscape posture mode and, when the rotation angle of the display 180 is 90 degrees, the posture mode of the display 180 is a portrait posture mode.

In addition, referring to FIG. 11, the landscape image 1110 and portrait image 1130 transmitted by the PC, the rotation angle of the display 180 and first to fourth mirrored images 1111, 1113, 1131 and 1133 displayed on the display 180 are shown.

The display directions of the landscape image 1110, the portrait image 1130 and the first to fourth mirrored images 1111, 1113, 1131 and 1133 may be distinguished by figure indicators located at vertices of images.

When the image transmitted from the PC to the display device 100 is the portrait image 1130 and the rotation angle of the display 180 is 90 degrees, the fourth mirrored image 1133 corresponding to the portrait image 1130 may be displayed on the display 180.

When user input is received at a point 1133a where a rectangular indicator of the fourth mirrored image 1133 is located, the display device 100 may obtain rotation coordinates obtained by rotating the coordinates of one point 1133a counterclockwise by 90 degrees.

When the resolutions of both devices are the same, the display device 100 may obtain the rotation coordinates as UIBC transform coordinates and transmit a control command including the obtained UIBC transform coordinates to the PC.

The PC may perform operation according to the control command with respect to a point 1130a corresponding to the UIBC transform coordinates included in the control command. This may be menu selection or app selection.

FIG. 8 will be described again.

The controller 170 of the display device 100 transmits the control command including the UIBC transform coordinates to the terminal 500 through the radio communication interface 173 (S817).

The controller 170 may transmit the control command to the terminal 500 through a user input back channel.

The control command may include the UIBC transform coordinates and a type of user input.

The type of user input may be any one of touch input or mouse input.

Touch input may be any one of touch up input, touch down input, scroll input or swipe input.

The terminal 500 performs operation according to the control command received at a point corresponding to the UIBC transform coordinates (S819).

Figure 12:
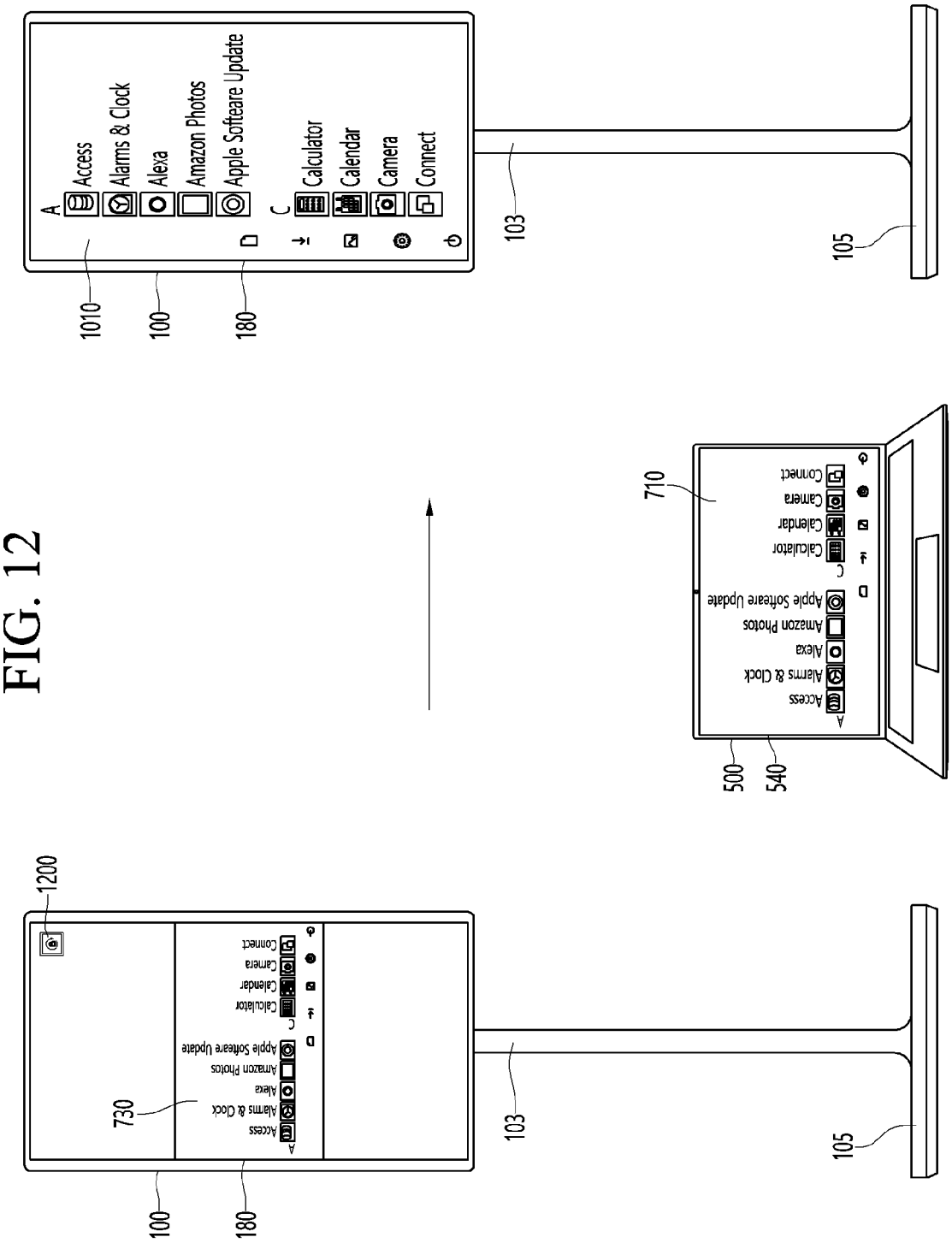
FIG. 12 is a view illustrating another embodiment of rotating a mirrored image when an image display mode of a PC is a portrait display mode and a posture mode of a display device is a portrait posture mode.

FIG. 12 is a view illustrating another embodiment of rotating a mirrored image when an image display mode of a PC is a portrait display mode and a posture mode of a display device is a portrait posture mode.

The terminal 500 may be a PC.

A source image 710 in the portrait direction is displayed on the display 540 in the portrait display mode. The terminal 500 transmits the source image 710 to the display device 100 according to a mirroring request.

The display device 100 displays a mirrored image 730 corresponding to the source image 710 in the portrait direction in the portrait posture mode.

The display device 100 may recognize the image display mode of the PC based on the image signal corresponding to the source image 710.

When the display device 100 does not recognize the image display mode of the PC, a display direction button 1200 may be displayed on the display 180.

The display device 100 may display the display direction button 1200 in an area in which the mirrored image 730 is not displayed.

In an embodiment, when the display direction button 1200 is selected, the display device 100 may display a mirrored image 1010 in a portrait direction obtained by rotating the mirrored image 730.

In another embodiment, the display direction button 1200 may be used to fix the display direction of the mirrored image 730.

That is, this is because there may be a need to fix or rotate the display direction of the mirrored image 730 according to the user.

Figure 13:
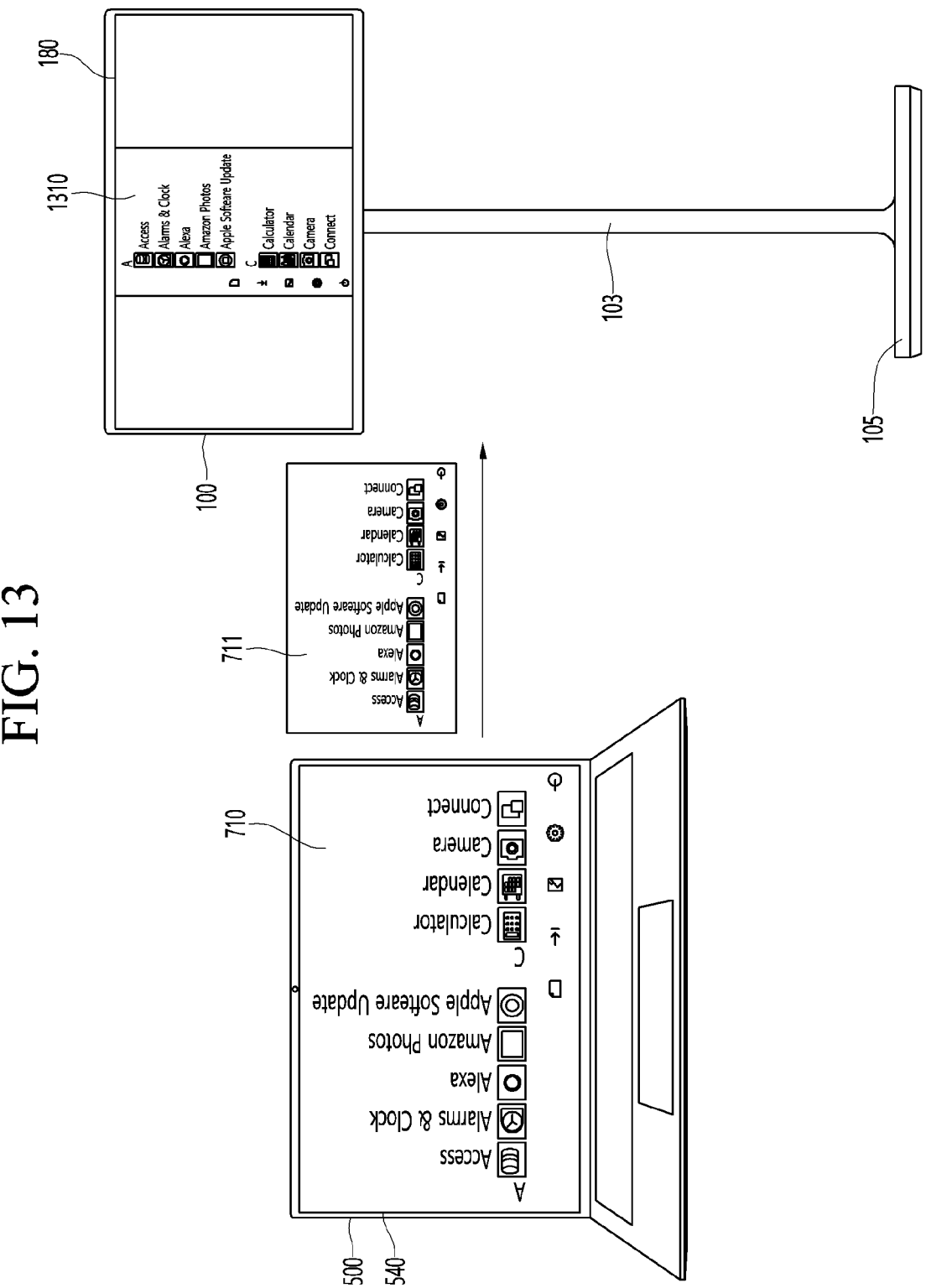
FIG. 13 is a view illustrating handling of a mirrored image when the posture mode of a display device according to an embodiment of the present disclosure is a landscape posture mode and an image display mode of a terminal is a portrait display mode.

FIG. 13 is a view illustrating handling of a mirrored image when the posture mode of a display device according to an embodiment of the present disclosure is a landscape posture mode and an image display mode of a terminal is a portrait display mode.

Referring to FIG. 13, the terminal 500 is a PC, the image display mode of the PC is a landscape display mode, and a portrait image 710 (source image) is displayed through the display 540.

The posture mode of the display device 100 is a portrait posture mode.

The terminal 500 may transmit, to the display device 100, an image signal 711 corresponding to a portrait image 710 according to a mirroring request (or Miracast request).

The display device 100 in the portrait posture mode may recognize text from the image signal 711 and determine the display direction of the image signal 711 through the arrangement direction of a character string configuring the text.

When the display direction of the image signal 711 is a portrait direction, the display device 100 may rotate the image signal 711 clockwise by 90 degrees and display a mirrored image 1030 in a portrait direction on the display 180.

Compared to FIG. 7b, according to the embodiment of FIG. 13, the user may watch the mirrored image 1310 in a correct direction, even when the display device 100 is a landscape posture mode.

Therefore, the user may not feel discomfort while watching the mirrored image 1310 and thus feel improved user experience.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described display device is not limited to the configuration and method of the above-described embodiments, but the embodiments may be configured by selectively combining all or part of each embodiment such that various modifications can be made.

What is claimed is:

1. A display device comprising:
   a wireless transceiver configured to receive, from a terminal, an image signal corresponding to a source image which is being displayed by the terminal;
   a display rotatable to be placed in a landscape posture mode or a portrait posture mode; and
   a controller configured to:
   determine a display direction of the received image signal when the display is placed in the portrait posture mode;
   rotate the received image signal clockwise by 90 degrees without rotating the display while the display is placed in the portrait posture mode if the determined display direction of the received image signal is a portrait direction; and
   in response to rotating the received image signal, display, on the display, a mirrored image in the portrait direction based on the rotated image signal while the display remains placed in the portrait posture mode.

2. The display device of claim 1, wherein the controller is further configured to determine the display direction of the image signal using an arrangement direction of a character string of text included in the image signal.

3. The display device of claim 2,
   wherein the controller is further configured to:
   determine the display direction of the image signal to be a landscape direction when the arrangement direction of the character string is from left to right, and
   determine the display direction of the image signal to be the portrait direction when the arrangement direction of the character string is from bottom to top.

4. The display device of claim 3,
   wherein the controller is further configured to:
   determine an image display mode of the terminal to be a portrait display mode when the display direction of the received image signal is the portrait direction, and
   determine the image display mode of the terminal to be a landscape display mode when the display direction of the received image signal is the landscape direction.

5. The display device of claim 1, wherein the controller receives user input while the mirrored image is displayed, obtains rotation coordinates obtained by rotating coordinates of a point where the user input is received counterclockwise by 90 degrees, and obtains transform coordinates by transforming the rotation coordinates according to an aspect ratio of the terminal.

6. The display device of claim 5, wherein the controller transmits, to the terminal, a control command including the transform coordinates and a type of the user input through a user input back channel (UIBC).

7. The display device of claim 1, wherein the terminal is a personal computer (PC).

8. A method of operating a display device including a display rotatable to be placed in a landscape posture mode or a portrait posture mode, the method comprising:
   receiving, from a terminal, an image signal corresponding to a source image which is being displayed by the terminal;
   determining a display direction of the received image signal when the display is placed in the portrait posture mode;
   rotating the received image signal clockwise by 90 degrees without rotating the display while the display is placed in the portrait posture mode if the determined display direction of the received image signal is a portrait direction; and
   in response to rotating the received image signal, displaying a mirrored image in the portrait direction on the display based on the rotated image signal while the display remains placed in the portrait posture mode.

9. The method of claim 8, wherein the determining comprises determining the display direction of the image signal using an arrangement direction of a character string of text included in the image signal.

10. The method of claim 9,
    wherein the determining the display direction of the image signal using the arrangement direction of the character string of the text comprises:
    determining the display direction of the image signal to be a landscape direction when the arrangement direction of the character string is from left to right, and
    determining the display direction of the image signal to be the portrait direction when the arrangement direction of the character string is from bottom to top.

11. The method of claim 10, further comprising:
    determining an image display mode of the terminal to be a portrait display mode when the display direction of the received image signal is the portrait direction, and
    determining the image display mode of the terminal to be a landscape display mode when the display direction of the received image signal is the landscape direction.

12. The method of claim 8, further comprising:
    receiving user input while the mirrored image is displayed,
    obtaining rotation coordinates obtained by rotating coordinates of a point where the user input is received counterclockwise by 90 degrees, and
    obtaining transform coordinates by transforming the rotation coordinates according to an aspect ratio of the terminal.

13. The method of claim 12, further comprising transmitting, to the terminal, a control command including the transform coordinates and a type of the user input through a user input back channel (UIBC).